Sept. 6, 1938.     A. ANDERTON     2,128,980

AUTOMATIC CENTRIFUGAL CLUTCH OR BRAKE

Filed Aug. 3, 1937     2 Sheets-Sheet 1

Inventor:
Alfred Anderton
By Chatwin Company
Attys

Sept. 6, 1938.  A. ANDERTON  2,128,980
AUTOMATIC CENTRIFUGAL CLUTCH OR BRAKE
Filed Aug. 3, 1937  2 Sheets-Sheet 2

Inventor:
Alfred Anderton
Attys

Patented Sept. 6, 1938

2,128,980

UNITED STATES PATENT OFFICE 2,128,980

AUTOMATIC CENTRIFUGAL CLUTCH OR BRAKE

Alfred Anderton, Castleton, near Manchester, England

Application August 3, 1937, Serial No. 157,079½
In Great Britain September 18, 1936

2 Claims. (Cl. 192—105)

This invention relates to friction clutches or brakes of the automatic centrifugal type, in which a driving boss carries shoes, which contact under centrifugal action with a driven member, and has for its principal object the provision of an improved clutch of this type.

A further object of the invention is to provide means for holding the shoes out of engagement below a predetermined speed.

In the accompanying drawings—

The constructional details and form may be varied from those described and illustrated, without departing from the invention.

Figure 1:
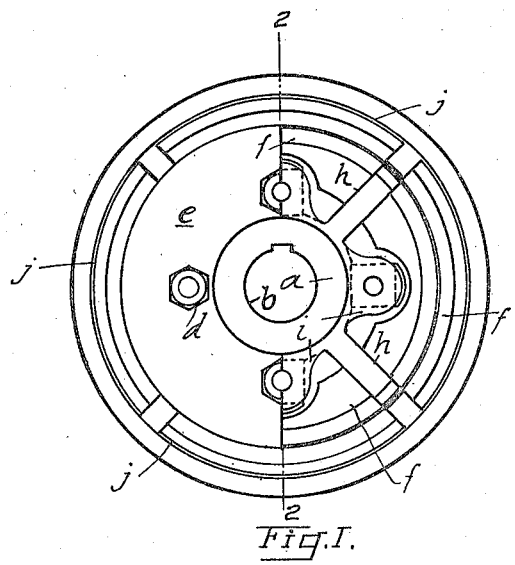
Figure 1 is a front view of one form of the improved clutch half of which is shown with the front flange removed.
Figure 2:
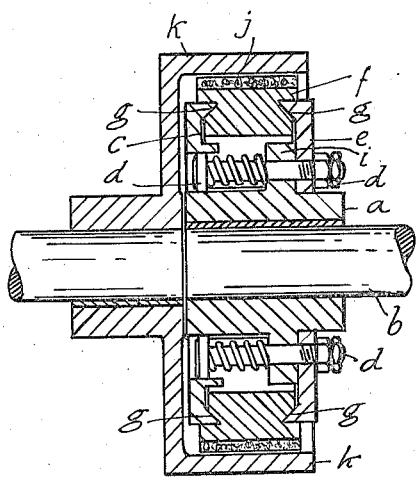
Fig. 2 shows the clutch in section as arranged for connecting two shaft ends, the section being taken on the line 2—2 of Fig. 1.
Figure 3:
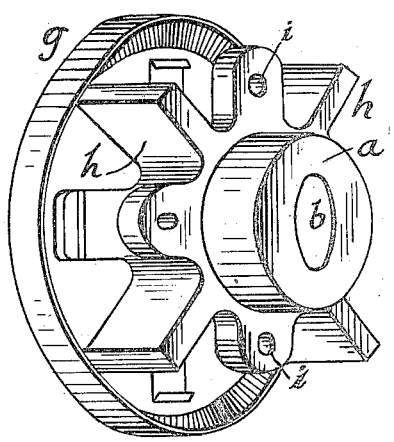
Fig. 3 is a perspective view of the boss and connected parts.
Figure 4:
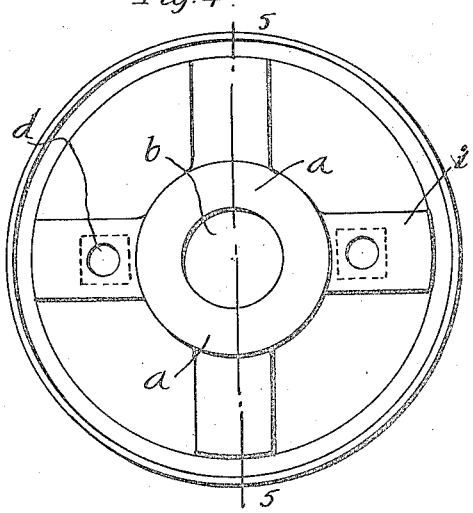
Fig. 4 is a similar view to Fig. 1 illustrating a modification, parts of the device being omitted.
Figure 5:
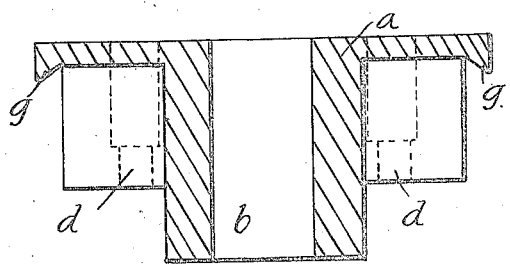
Fig. 5 is section taken on the line 5—5 of Fig. 4.

The driving boss $a$ is keyed to the driving shaft $b$ and may be cast integral with a flange $c$, this flange $c$ being provided with holes to receive the heads of the spring loaded bolts $d$. A flange $e$ is loosely mounted on boss $a$ and held in position by the spring loaded bolts $d$. The driving shoes $f$ are usually lined with a friction material $j$ and are provided with a groove at each side of suitable V-section forming conical surfaces, and are clamped between the flanges $c$ and $e$ under pressure of the spring loaded bolts $d$, both these flanges having conical surfaces $g$ at their periphery which fit into the V-grooves in the driving shoes $f$. On reference to Fig. 1 it will be seen that the driving boss $a$ is provided with a number of driving lugs $h$ according to the number of driving shoes used (four being shown), these form pockets into which the driving shoes are placed thus ensuring that same revolve with the boss $a$, lugs or ears $i$ are also provided on boss $a$ which are drilled to receive the spring loaded bolts $d$; these lugs or ears, by slightly altering the design as shown in Figs. 4 and 5, may also be used as driving lugs if desired, in which case, lugs $h$ will not be required. It will readily be seen that the spring loaded bolts $d$ may be adjusted so as to hold the driving shoes $f$ out of engagement with the driven member $k$ until a desired speed is attained by the driving shaft $b$, after which they will move radially outward sliding up the conical surfaces $g$, the flange $e$ moving slightly axially outward, driving connection being thereby obtained. The driven member $k$ may be combined with a pulley or wheel or may be arranged as a fixed member, should it be desired to use the clutch as a centrifugal brake.

I claim:

1. A centrifugal clutch comprising a driving member and a driven member, shoes carried by the driving member, flanges mounted on the driving member coaxial thereto, one of said flanges being spring controlled the shoes being clamped between said flanges so as to be held out of engagement with the driven member below a predetermined speed of the clutch, and said flanges having conical surfaces adapted to engage coned surfaces formed on both sides of each shoe.

2. A centrifugal clutch comprising a driving member and a driven member provided with a driving boss, shoes carried by the driving member, a flange mounted fast on the driving boss, holes in said flange, a second flange loosely mounted on the driving boss and held in position by spring loaded bolts the heads of which are located in the first mentioned flange, conical surfaces provided on said flanges and coned surfaces formed on both sides of each shoe to co-operate therewith.

ALFRED ANDERTON.